US007547167B2

(12) United States Patent
Baber et al.

(10) Patent No.: US 7,547,167 B2
(45) Date of Patent: Jun. 16, 2009

(54) STORAGE DRAWER FOR HAND-HELD POWER TOOL

(75) Inventors: Brad M. Baber, Arlington Heights, IL (US); Dean Peterson, Chicago, IL (US); Harald Krondorfer, Mundelein, IL (US)

(73) Assignee: Robert Bosch GmbH, Stuttgart (DE)

( * ) Notice: Subject to any disclaimer, the term of this patent is extended or adjusted under 35 U.S.C. 154(b) by 664 days.

(21) Appl. No.: 11/229,296

(22) Filed: Sep. 16, 2005

(65) Prior Publication Data

US 2007/0065246 A1 Mar. 22, 2007

(51) Int. Cl.
*B23C 1/20* (2006.01)

(52) U.S. Cl. ...................................................... 409/182

(58) Field of Classification Search ................. 409/179, 409/182; 144/136.95; 81/490, 177.4; 408/241 R; 279/149, 150; 206/362; 16/111.1; 211/70.6
See application file for complete search history.

(56) References Cited

U.S. PATENT DOCUMENTS

| | | | | |
|---|---|---|---|---|
| 1,751,781 | A | 3/1930 | Weiss | |
| 2,211,216 | A | 8/1940 | Oster | |
| 2,702,098 | A | 2/1955 | Staak | |
| 2,842,260 | A * | 7/1958 | Molitor | 206/379 |
| 2,897,302 | A | 7/1959 | Godfrey et al. | |
| 3,511,947 | A | 5/1970 | Eikermann et al. | |
| 3,533,655 | A | 10/1970 | Harley | |
| 3,767,876 | A | 10/1973 | Batson | |
| 3,872,951 | A | 3/1975 | Hastings, Jr. | |
| 3,899,852 | A | 8/1975 | Batson | |
| 4,061,126 | A | 12/1977 | Schlangen | |
| 4,133,128 | A | 1/1979 | Brush | |
| 4,280,026 | A | 7/1981 | Alessio | |
| 4,489,525 | A | 12/1984 | Heck | |
| 4,520,256 | A | 5/1985 | Doyle | |
| 4,577,365 | A | 3/1986 | Yuen | |
| 4,577,367 | A | 3/1986 | Durand | |
| 4,735,020 | A | 4/1988 | Schulz et al. | |
| 4,932,294 | A | 6/1990 | Chang | |
| 4,934,223 | A | 6/1990 | Wong | |
| 4,973,205 | A * | 11/1990 | Spaulding | 408/16 |
| 5,022,131 | A * | 6/1991 | Hobbs | 29/40 |
| 5,022,188 | A | 6/1991 | Borst | |
| 5,056,661 | A * | 10/1991 | Balzano | 206/372 |

(Continued)

FOREIGN PATENT DOCUMENTS

WO WO 01/19228 A1 3/2001

OTHER PUBLICATIONS

Cutting tool of a type understood to be commercially available from Sears, Roebuck and Co. (two photographs, one sheet).

(Continued)

*Primary Examiner*—Dana Ross
(74) *Attorney, Agent, or Firm*—Foley & Lardner LLP

(57) ABSTRACT

The present invention relates to a hand-held power tool. The hand-held power tool includes a housing with cavity. A drawer is provided within the cavity. A flexible member is coupled to the drawer. Furthermore, a latching mechanism with first and second members are included. The first member of the latching mechanism is coupled to the housing and the second potion of the latching mechanism is incorporated into the flexible member.

12 Claims, 9 Drawing Sheets

U.S. PATENT DOCUMENTS

| | | | | |
|---|---|---|---|---|
| 5,074,081 | A | 12/1991 | Beth et al. | |
| 5,098,235 | A | 3/1992 | Svetlik et al. | |
| 5,121,803 | A * | 6/1992 | Hartmann et al. | 173/171 |
| 5,143,490 | A | 9/1992 | Kopras | |
| 5,191,968 | A | 3/1993 | McCurry | |
| 5,323,823 | A | 6/1994 | Kopras | |
| 5,346,342 | A | 9/1994 | Winchester | |
| 5,369,236 | A | 11/1994 | Nickels, Jr. | |
| 5,445,479 | A | 8/1995 | Hillinger | |
| 5,558,570 | A | 9/1996 | Nakamura et al. | |
| 5,639,192 | A * | 6/1997 | Chen | 408/88 |
| 5,810,525 | A | 9/1998 | Ector, Sr. | |
| 5,813,805 | A | 9/1998 | Kopras | |
| 5,819,913 | A | 10/1998 | Reiter | |
| 5,902,080 | A | 5/1999 | Kopras | |
| 6,048,260 | A | 4/2000 | Kopras | |
| 6,152,639 | A | 11/2000 | Hsu | |
| 6,169,258 | B1 | 1/2001 | Roney et al. | |
| D439,122 | S | 3/2001 | Adler et al. | |
| D439,484 | S | 3/2001 | Adler et al. | |
| 6,196,093 | B1 | 3/2001 | Hu | |
| 6,327,781 | B1 | 12/2001 | Sinclair et al. | |
| 6,364,580 | B1 | 4/2002 | Dils et al. | |
| D458,333 | S | 6/2002 | Power | |
| 6,443,675 | B1 | 9/2002 | Kopras et al. | |
| 6,443,676 | B1 | 9/2002 | Kopras | |
| 6,454,427 | B1 | 9/2002 | Chen | |
| D465,393 | S | 11/2002 | Kopras et al. | |
| D465,712 | S | 11/2002 | Kopras et al. | |
| D466,775 | S | 12/2002 | Kopras et al. | |
| 6,488,451 | B1 | 12/2002 | Hartman | |
| D473,770 | S | 4/2003 | Kopras et al. | |
| 6,626,295 | B1 * | 9/2003 | Vasudeva | 206/373 |
| 6,702,530 | B2 * | 3/2004 | Bennage et al. | 408/241 R |
| 6,729,480 | B1 | 5/2004 | Blake | |
| 6,754,935 | B2 | 6/2004 | Pozgay et al. | |
| 6,786,685 | B2 | 9/2004 | Schaub et al. | |
| 6,802,108 | B2 | 10/2004 | Haselby et al. | |
| 6,803,683 | B2 | 10/2004 | Bone et al. | |
| 6,814,157 | B2 | 11/2004 | Maras | |
| 6,854,938 | B2 | 2/2005 | Kopras et al. | |
| 6,880,281 | B1 | 4/2005 | Orr | |
| 6,886,643 | B2 | 5/2005 | Riley et al. | |
| 6,890,135 | B2 | 5/2005 | Kopras et al. | |
| 6,902,356 | B2 * | 6/2005 | Breitenmoser | 408/124 |
| 6,918,720 | B2 | 7/2005 | Kopras et al. | |
| 6,926,477 | B2 | 8/2005 | Allemann et al. | |
| 2003/0088941 | A1 | 5/2003 | Rotondi | |
| 2004/0187322 | A2 | 9/2004 | Bednar et al. | |
| 2004/0191021 | A1 | 9/2004 | Breitenmoser | |
| 2004/0206649 | A1 | 10/2004 | Chen | |
| 2005/0081364 | A1 | 4/2005 | Kopras et al. | |
| 2005/0097759 | A1 | 5/2005 | Igarashi | |

OTHER PUBLICATIONS

Owner's manual for "Craftsman All-In-One Cutting Tool," understood to be commercially available from Sears, Roebuck and Co., dated Jul. 21, 2003 (three sheets).

US 6,385,032, 12/2004, Pozgay et al. (withdrawn)

* cited by examiner

STORAGE DRAWER FOR HAND-HELD POWER TOOL

BACKGROUND

The present invention relates generally to the field of hand-held power tools such as rotary cutting tools. More particularly, the present invention relates to hand-held power tools that include storage drawers selectively securable to the housing of such power tools.

It is known to provide storage for a variety of attachments for power tools such as drilling or rotary cutting tools. It is further known to incorporate such storage devices within the tool housing. Such known storage compartments do not realize certain advantageous features and/or combinations of features as described herein.

Hand-held power tools generally include a housing and an electric motor contained within the housing. The motor is configured to move a tool bit or other cutting accessory at high speeds to form cuts in a workpiece (e.g., a piece of wood, drywall, tile, etc.). For example, a hand-held rotary cutting tool such as that disclosed in U.S. Pat. Nos. 5,813,805 and 6,443,675 to Kopras et al. (the disclosures of which are incorporated by reference herein in their entirety) is configured to rotate a helical or spiral cutting tool bit that includes a sharp cutting edge wrapped in a helix around the longitudinal axis of the bit. According to this example, the tool is configured to allow the formation of cuts in a workpiece by moving the tool in a direction perpendicular to the longitudinal axis of rotation of the bit (i.e., the tool is arranged normal to the workpiece surface and moved parallel to the surface of the workpiece to allow the edges of the bit to remove material from the workpiece).

Hand-held rotary cutting tools utilize a motor to rotate a tool bit at variable speeds. The motor drives a motor shaft which extends from one end of a motor housing along the central longitudinal axis thereof. A mechanical structure, such as a conventional drill chuck or a collet system, is mounted on the end of the motor shaft outside of the motor housing for attaching tool bits and other accessories or attachments to the motor shaft. Some power tools include integrated storage compartments for the storage of bits and accessories used with the tool.

Accordingly, it would be advantageous to provide a storage compartment for a hand-held tool that has a more ergonomically suitable design than conventional compartments and provides a relatively simple locking mechanism, hence requiring less assembly parts and reduced manufacturing resources.

SUMMARY

An exemplary embodiment relates to a hand-held power tool. The hand-held power tool includes a housing with cavity. A drawer is provided within the cavity. A flexible member is coupled to the drawer. Furthermore, a latching mechanism with first and second members are included. The first member of the latching mechanism is coupled to the housing and the second member of the latching mechanism is coupled to the flexible member.

Another exemplary embodiment of the invention relates to a hand-held power tool having a housing that defines a cavity. A drawer is provided within the cavity. Further, a lip is coupled to the drawer that includes opposing ends. A locking means is configured to secure the drawer within the cavity when the storage compartment of the drawer is fitted within the cavity. Upon squeezing the opposing ends of the lip, the drawer may be released from the cavity. Moreover, a means for sliding the drawer in and out of the cavity is provided.

Another exemplary embodiment relates to storage drawer which includes a flexible member coupled thereto. A latching mechanism is also provided. The latching mechanism has a first member and second member. The flexible member includes first and second ends which are configured in a manner to move the second member of the latching mechanism with respect to the first member of the latching mechanism upon compressing the first and second ends of the flexible member with respect to each other.

DETAILED DESCRIPTION OF EXEMPLARY EMBODIMENTS

Figure 1:
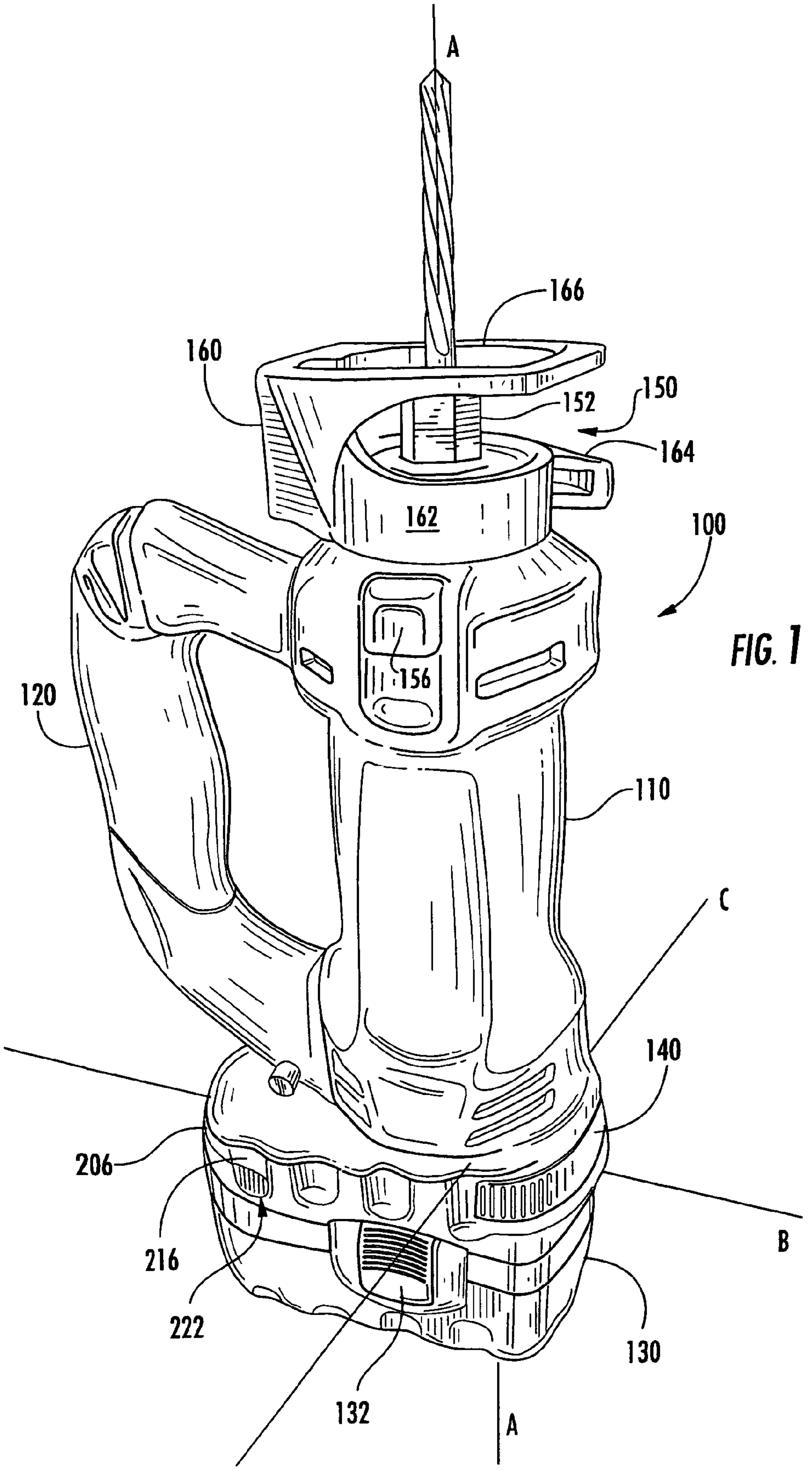
FIG. 1 is a perspective view of a hand-held power tool according to an exemplary embodiment.
Figure 2:
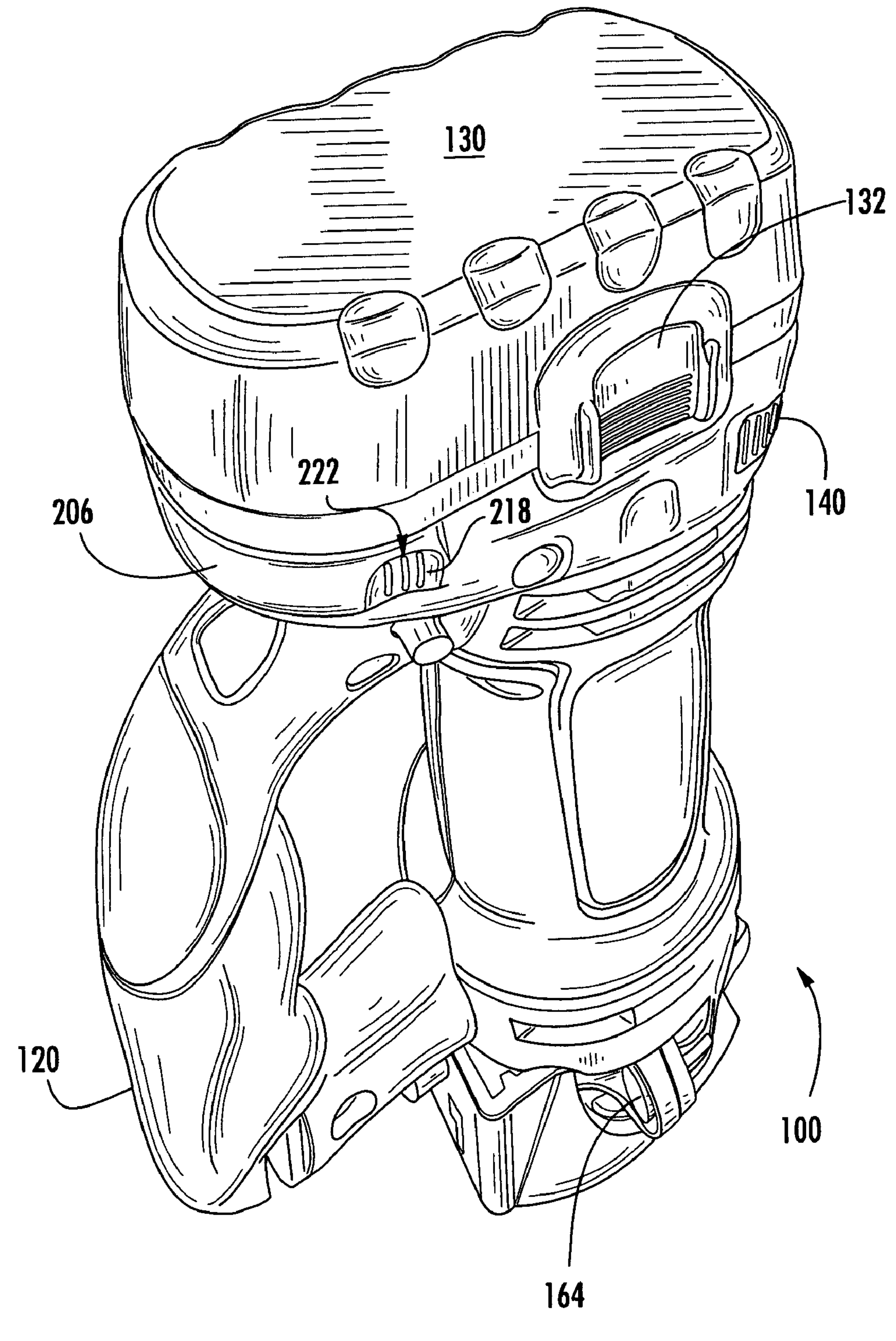
FIG. 2 is another perspective view of the hand-held power tool shown in FIG. 1.

A hand-held rotary power tool 100 in the form of a rotary cutting tool is shown generally in FIGS. 1 and 2. The hand-held tool has a central vertical, longitudinal and lateral axis—A, B, and C respectively—as illustrated in FIG. 1. It should be understood that, although the present invention will be described in detail herein with reference to the exemplary embodiment of a rotary cutting tool 100 shown in FIGS. 1 and 2, the present invention may be applied to, and find utility in, other types of hand-held power tools as well (e.g. saws, routers, etc.), and therefore, the scope of this invention is not limited to application in a rotary cutting tool 100.

The hand-held tool 100 includes a housing or casing 110 to which a handle 120 is attached. The housing 110 is preferably made of an electrically insulating material such as hard plastic. The housing 110 is generally cylindrical in shape and may be formed as two or more molded pieces which are joined together to form the housing 110 in a conventional manner, such as using fasteners, an adhesive, welding, or a combination thereof.

A motor (not visible in FIGS. 1 and 2) is enclosed within the housing 110. The motor is turned on and off by a power on/off switch 140. According to an exemplary embodiment, the switch 140 is pulled away from the housing 110 to activate the motor. The motor may be configured to operate at a single speed (e.g., a speed between approximately 15,000 and 30,000 rpm) or a number of speeds (e.g., speeds of 15,000 rpm; 20,000 rpm; and 30,000 rpm). In a case where the motor is capable of operating at multiple speeds, the switch may include multiple positions corresponding to the desired motor speed.

The motor of the tool 100 drives a motor shaft to which a device or mechanism 150 is coupled for securing a cutting accessory (e.g., a helical cutting tool bit or other accessory) to the motor shaft. As shown in FIG. 1, the device 150 includes a collet (not shown) and a collet nut 152 for securing a tool bit 154 to the motor shaft of the tool 100. According to an exemplary embodiment, the tool bit 154 includes a cutting edge wrapped around the axis of the bit in a helix or spiral. This cutting edge is designed such that the tool bit 154, when rotated at high speed, will cut through a workpiece in a direction substantially perpendicular to the axis of the bit.

To secure the tool bit 154 to the motor shaft, a shank of the bit is inserted into a central aperture of the collet, after which the collet nut 152 is tightened. A shaft lock 156 is used to prevent rotation of the motor shaft when the collet nut 152 is being loosened and tightened. As the collet nut 152 is tightened down on the threaded end of the shaft, the collet is compressed within the collet nut 152 between a partially closed end of the collet nut 152 and the shaft. The collet is slotted and has tapered ends such that when the collet is compressed between the collet nut 152 and the shaft, the collet is compressed radially, causing the central aperture of the collet to close tightly around the shank of the tool bit. To remove the bit from the motor shaft, the collet nut 152 is loosened until the bit can be removed easily from the central aperture of the collet.

To set the depth of cut to be made by the tool 100, an adjustable depth guide assembly 160 may be provided. The depth guide 160 is attached to the housing 110 adjacent the location where the motor shaft emerges from the tool 100.

As shown in FIG. 1, a depth guide bracket 162 is selectively attachable to the housing 110, and may be attached to the housing 110 in any conventional manner. For example, the depth guide bracket 162 may be formed to have a split collar structure and a cam closing mechanism 164 (e.g., an over-center latch) which is operated to close the collar tight around the end of the tool 100, and which may be operated to loosen the collar to remove the bracket 162 from the tool 100.

The depth of cut of the power tool 100 may be set by moving an extending portion 166 of the depth guide 166 in a direction along the longitudinal axis of the tool bit 154. A locking mechanism may then be used to lock the extending portion 166 in a fixed position relative to the bracket 162 to securely fix the depth guide 160 in place. The locking mechanism may be implemented as a cam lever, as a threaded nut or a screw, or as any other suitable type of device or mechanism.

The motor receives electrical power from a battery or battery pack 130 selectively coupled to the power tool at an end thereof. A locking member or element 132 is provided to allow the battery pack 130 to be removed when the member 132 is depressed. According to an exemplary embodiment, the battery pack 130 includes one or more rechargeable batteries and has a fully charged voltage of between approximately 12 and 24 volts. According to a particular exemplary embodiment the battery pack has a fully charged voltage of approximately 18.6 volts. The battery pack 130 may include any suitable type of batteries, such as nickel-metal hydride or lithium-ion batteries. While the exemplary embodiment shows use of a battery to power the motor those skilled in the art will understand that the innovation described herein are also suitable for use in a hand-held power tool which incorporates a conventional cord for AC power.

Figure 3:
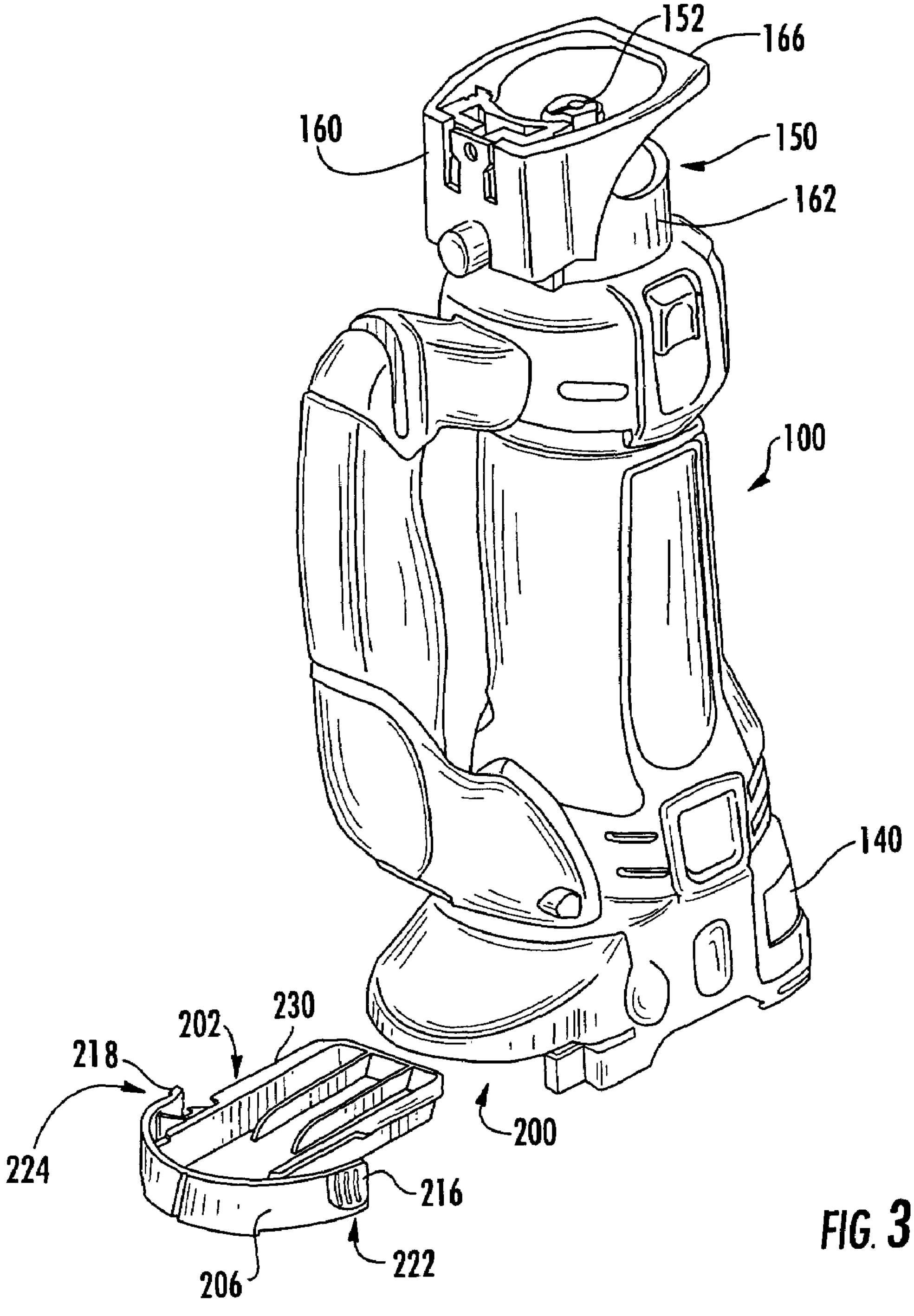
FIG. 3 is a perspective view of the hand-held power tool shown in FIG. 1 illustrating a drawer and storage compartment removed from the tool housing according to an exemplary embodiment.

A cavity or space 200, as shown in FIG. 3, is defined within the housing of the tool 100. In an exemplary embodiment, the cavity 200 is proximate the battery pack 130 (super- or subjacent the battery pack 130 along the vertical axis (A) of the power tool as shown in FIG. 1). The volume of the cavity 200 may vary according to various exemplary embodiments and may be limited by the spacing requirements of adjacent components in the hand-held power tool, namely the handle 120, power on/off switch 140 and motor (not shown).

Figure 4A:
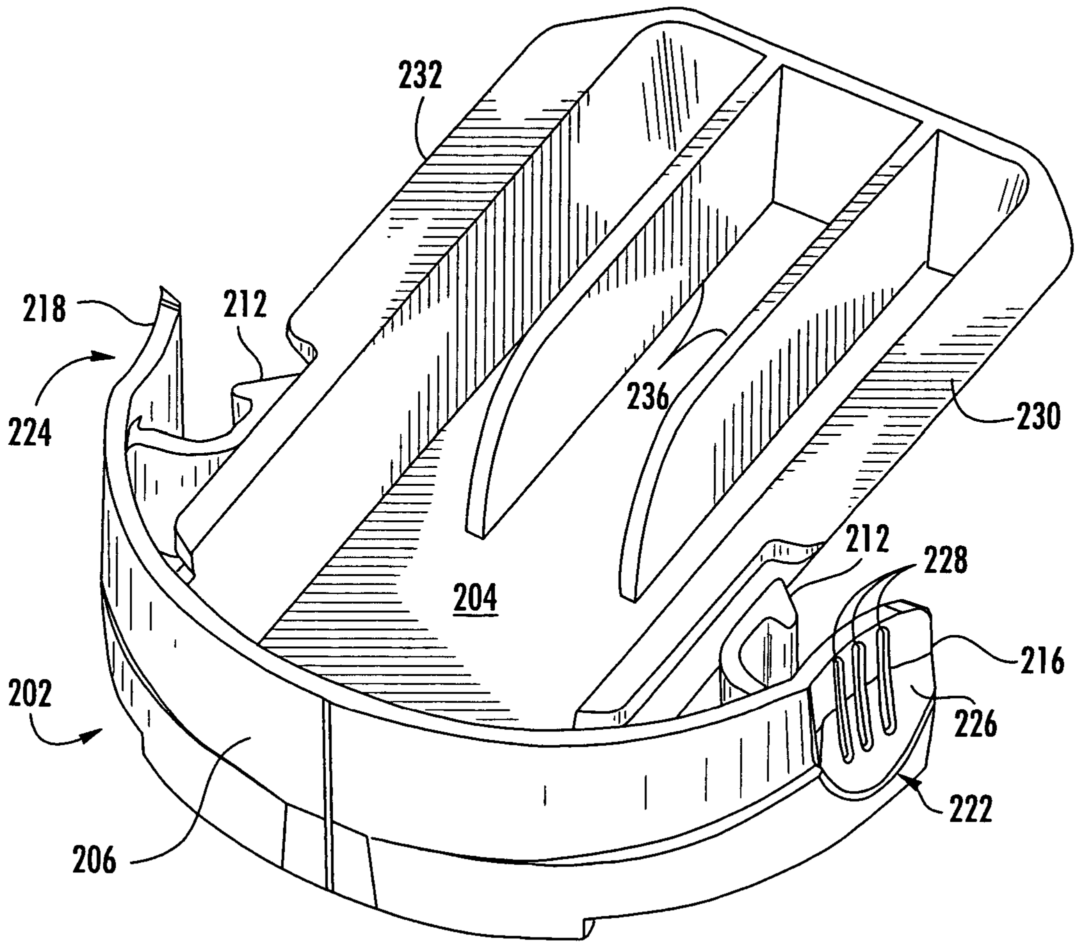
FIG. 4*a* is a front perspective view of the drawer and storage compartment according to an exemplary embodiment.
Figure 4B:
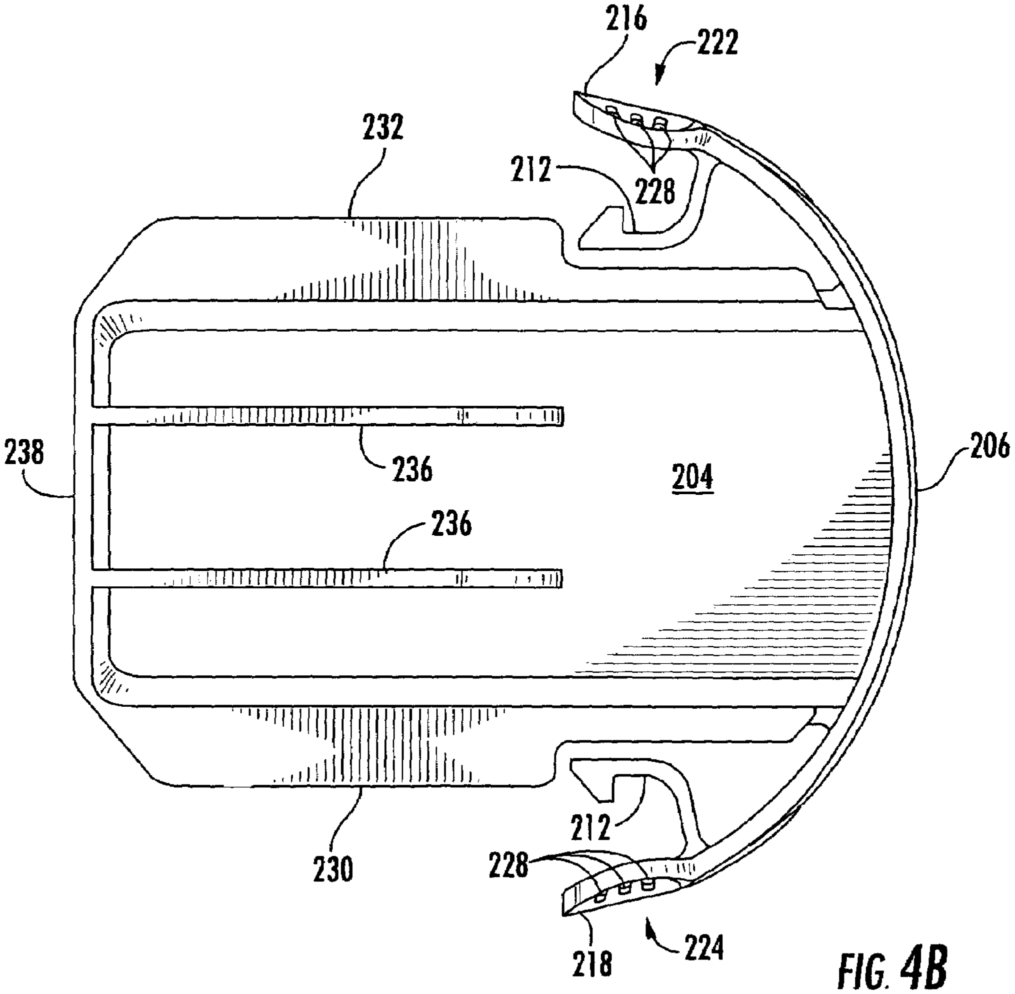
FIG. 4*b* is a top plan view of the drawer and storage compartment according to an exemplary embodiment.

A drawer or container 202 may be selectively provided within the cavity 200 of the housing 110. The drawer 202 is composed of a hard plastic and may be die cast or injection molded. The drawer 202 defines a storage compartment 204 suitable for tool accessories (e.g., tool bits, collets, collet nuts, etc.),as seen in FIGS. 4A and 4B; the storage compartment 204 preferably includes walls or dividers 236 which may effectively segregate the storage compartment into compartments smaller in volume. In the embodiment shown, the dividers 236 extend within the storage compartment 204 with respect to the hand-held tool 100 along the vertical and longitudinal axes (A and B) which are illustrated in FIG. 1. Those reviewing this disclosure should, however, recognize that the dividers 236 need not be identically configured, as illustrated in FIG. 4*b*, but may be configured in various arrangements to suit the desired utility of the storage drawer 202.

A flexible member or lip 206, as shown in FIGS. 1-6, is secured to the drawer 202. The flexible member 206 is contoured to the shape of the tool housing 110 and the battery pack 130 so that the flexible member 206 may be flush with the housing 110 and battery pack 130 when the storage compartment 204 of the drawer 202 is completely stowed within the tool housing 110. The flexible member 206 is preferably composed of an electrically insulating material such as a resiliently flexible hard plastic. The flexible member 206 has a first end 216, and a second end 218. The flexible member 206 deforms upon compression (or squeezing) substantially parallel to the central lateral axis (C) of the hand-held tool (as shown in FIG. 1). Upon such compression, the first and second ends (216, 218) move closer together along the lateral axis of the hand-held power tool 100.

In an exemplary embodiment, the flexible member 206 includes two grip locations, 222 and 224, each of which are respectively located on the outer surface of the first and second ends (216, 218) of the flexible member. Each grip location defines a surface 226 suitable for fingertips. The surface 226 may be flat, convex, or concave to accomplish this. The grip locations (222, 224) further include a series of depressions 228 that extend along the vertical axis (A) of the tool housing 110. The depressions 228 provide additional surface grip (or improve clutching) when handling the drawer by the flexible member 206. As an alternative to the depressions 228, a series of protrusions may be utilized to accomplish the same.

Figure 4C:
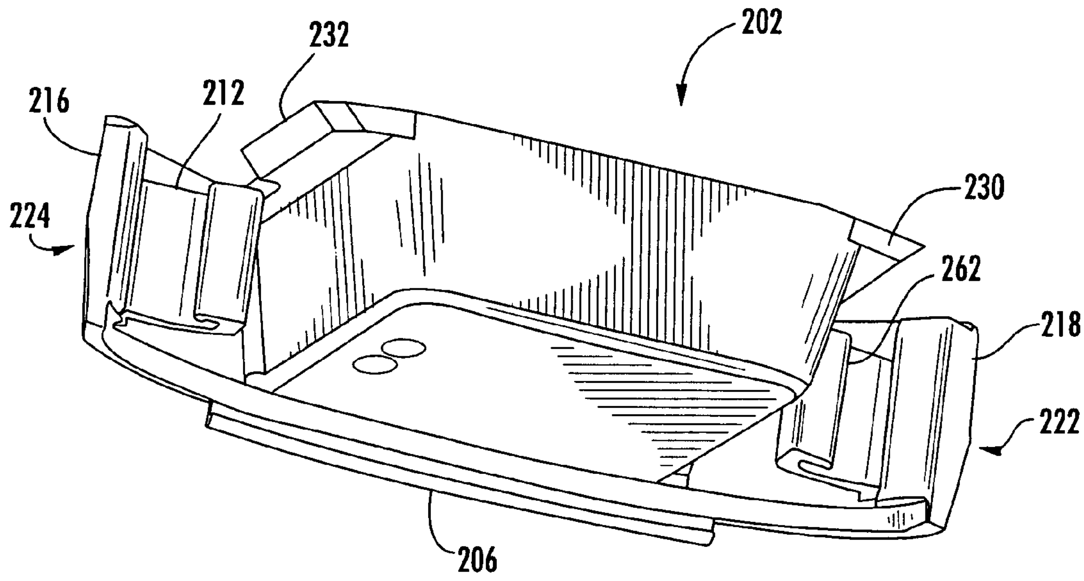
FIG. 4*c* is a rear perspective view of the back of the drawer and storage compartment according to an exemplary embodiment.
Figure 5:
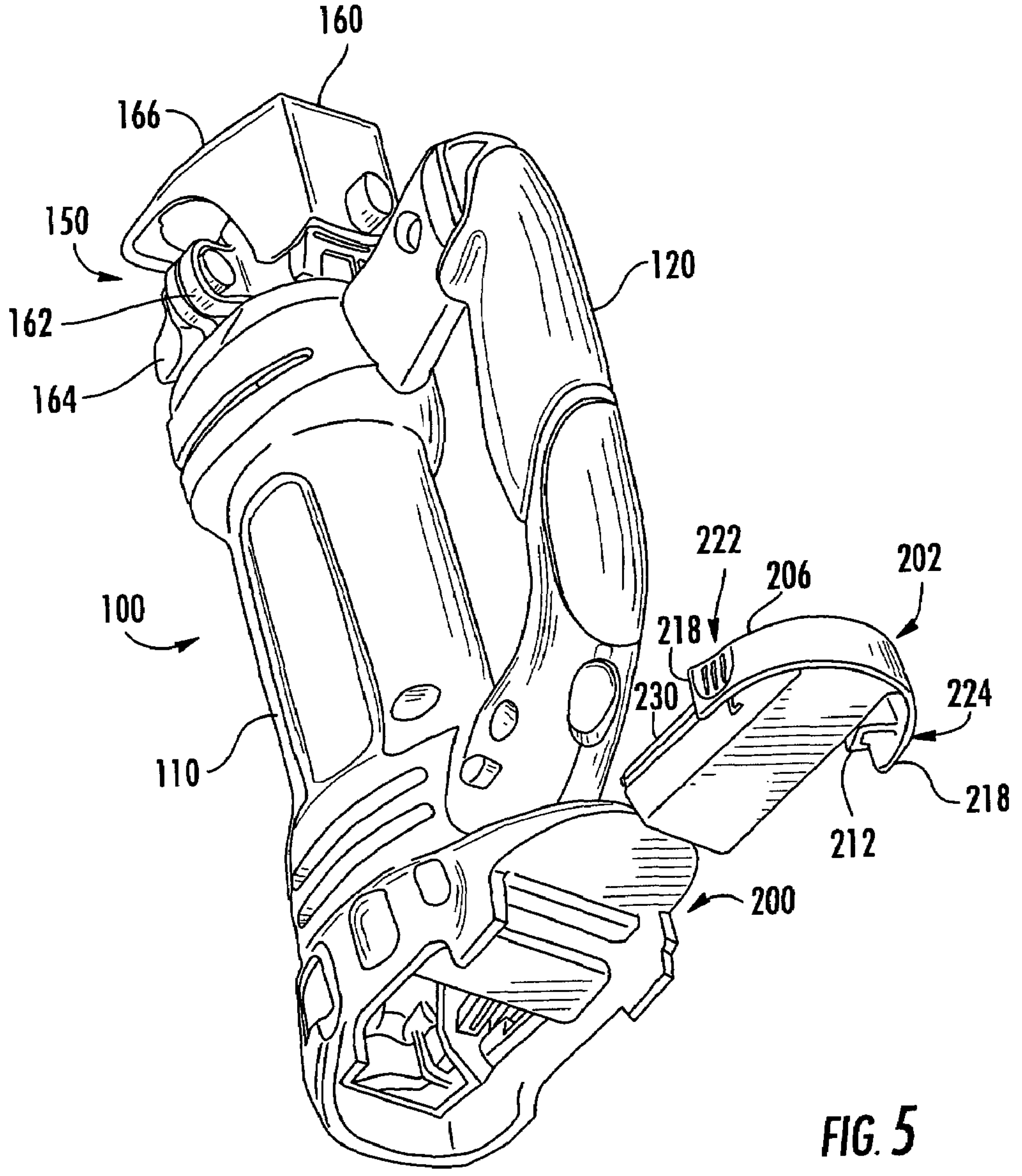
FIG. 5 is a perspective view of the hand-held power tool shown in FIG. 1 illustrating the drawer and storage compartment in the released position according to an exemplary embodiment.
Figure 6:
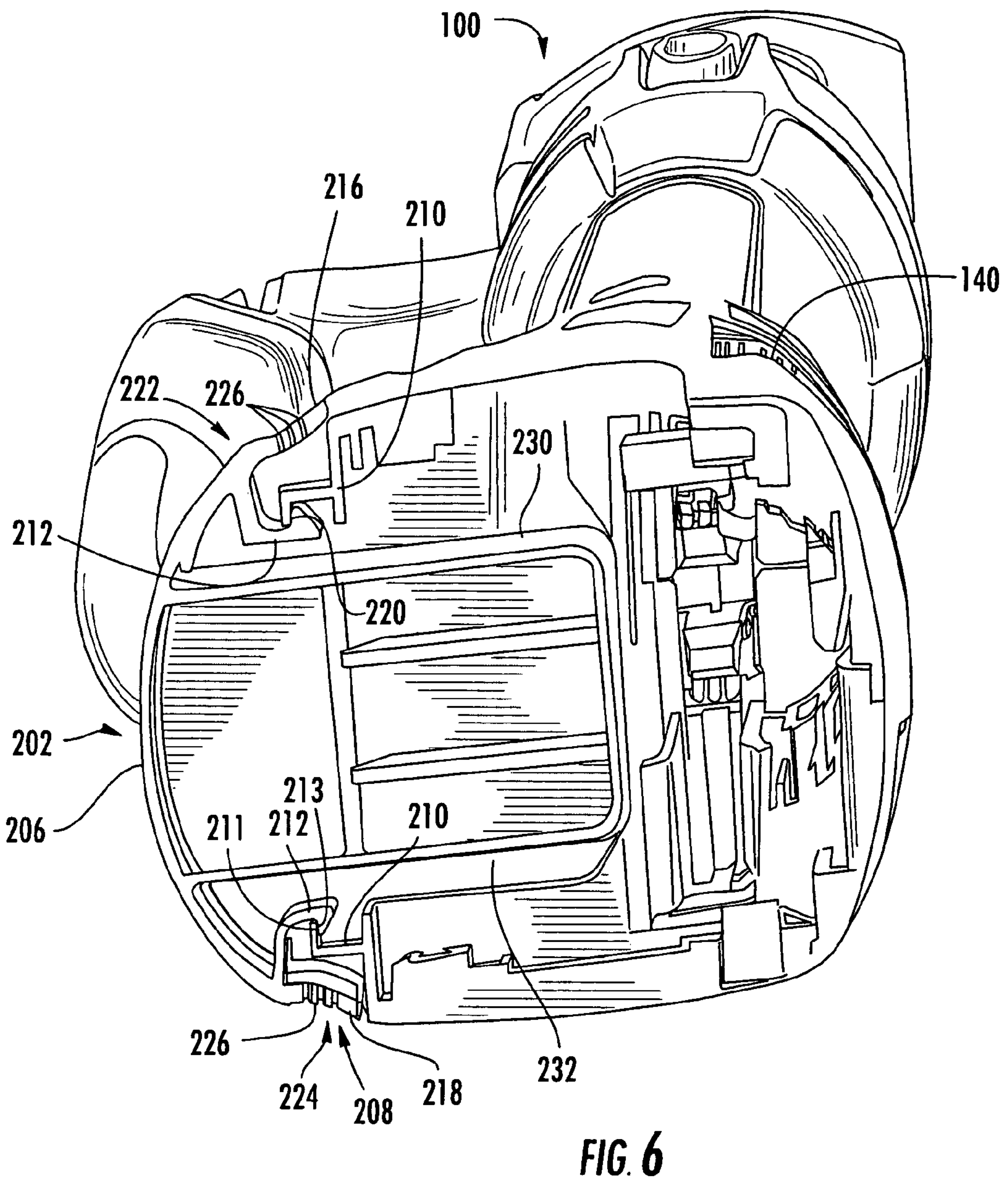
FIG. 6 is a perspective view of the hand-held power tool shown in FIG. 1 illustrating the drawer and storage compartment in the locked position according to an exemplary embodiment.
Figure 7:
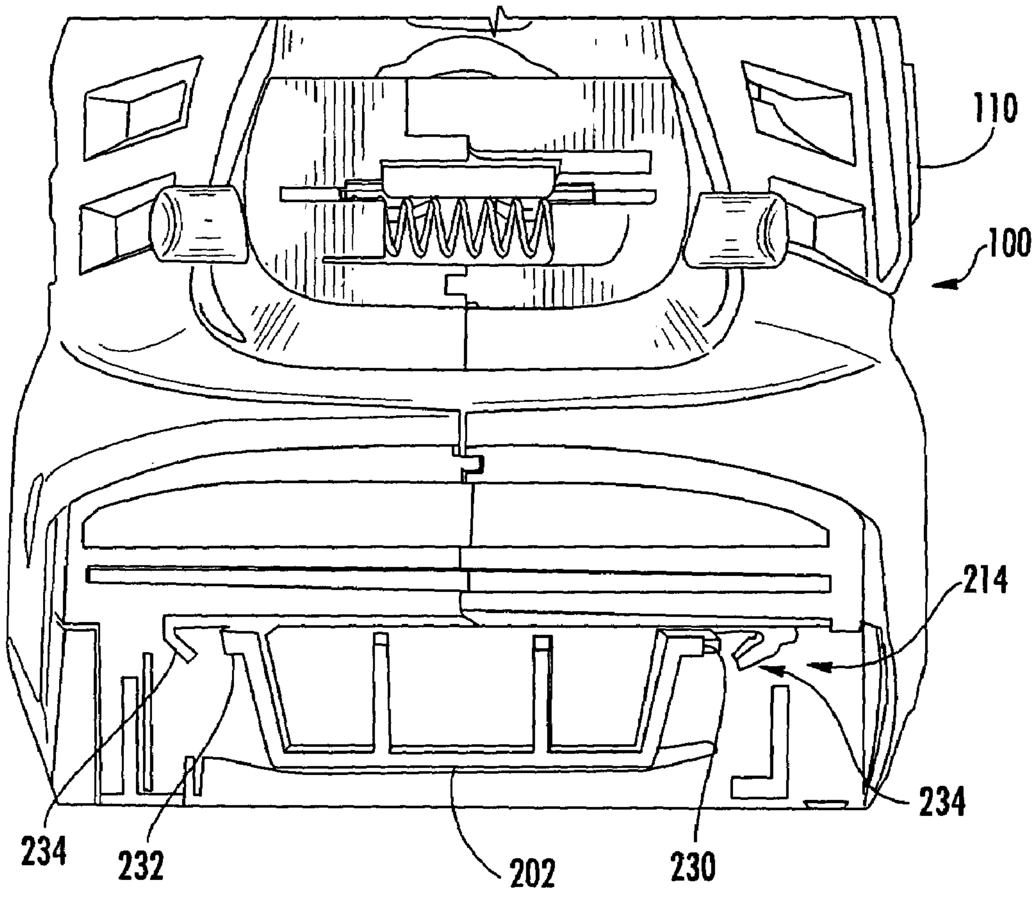
FIG. 7 is a cross-sectional view of the hand-held power tool illustrating the drawer and storage compartment in the locked position according to an exemplary embodiment.

A latching mechanism 208 (as shown in FIG. 6) is coupled to the flexible member 206 of the drawer 202. The latching mechanism 208 functions to selectively lock or secure the drawer 202 in the cavity 200 of the power tool housing 110. The latching mechanism 208 includes a first member or element 210 in the form of a catch and a second member or element 212 in the form of a latch or hook. The first member 210 of the latching mechanism 208 is secured to the housing 110 as shown in FIG. 6. The first member 210 of the latching mechanism defines a surface 211 complementary with a surface 213 on the second member 212 which is incorporated with the first and second ends (216, 218) of the flexible member 206 as shown in FIGS. 4*a*-*c*. The arms or portions of the flexible member 206 proximate the first and second ends (216, 218) function as a leaf spring thereby biasing the first and second ends into the locking position (i.e., interlocking the first and second ends (216, 218) with the first and second members (210, 212) respectively. The second member 212 is also flexible with respect to the flexible member 206. The surface 211 of the first member 210 is angled in a manner to secure the interaction between the first and second members (210, 212) of the latching mechanism 208. As illustrated in FIG. 7, the interacting surfaces (211 and 213 respectively) of the first and second members run parallel to the central lateral axis (C) of the tool housing 110 to accomplish this function. Therefore, the drawer 202 will remain in place regardless of how the hand-held power tool 100 is positioned provided the latching mechanism 208 has not been released.

The latching mechanism 208 may be released by moving the second member 212 of the latching mechanism with respect to the first member 210, thereby loosening the interaction between the first and second members of the latching mechanism. The first and second ends (216, 218) of the flexible member 206 may be compressed parallel to the lateral axis (C) of the tool housing 110 to sufficiently move the second member 212 and release the latching mechanism 208 (and drawer 202) from the tool housing 110.

A rail system 214 (as shown in FIG. 7) is provided within the tool housing 110 to enable the drawer 202 to slide in and out of the cavity 200. The rail system 214 includes at least one protruding surface (230 or 232 on the drawer 202) and a complementary channel 234, defined within the tool housing. As illustrated in FIG. 7, the rail system 214 includes two protruding surfaces (230 and 232) incorporated with the drawer 202 and two complementary channels defined within the housing 110, proximate the cavity 200. Such arrangement may be referred to as a "dovetail" type rail. Other rail systems may be utilized in place of that shown in FIG. 7. However, the shown rail system restricts the drawer 202 from moving along the vertical and lateral axes (A and B, respectively) of the tool housing 110 (i.e., all non-sliding directions), thereby only allowing movement in the sliding direction—i.e., along the longitudinal axis (C) of the housing 110 for maneuvering the drawer 202 in and out of the tool housing 110.

While an exemplary embodiment includes a latching mechanism 208 configured to selectively secure the drawer 202 within the housing cavity 200, according to other exemplary embodiments, a latching mechanism 208 may be provided. The latching mechanism 208 is configured to secure the drawer 202 within the cavity 200 when the drawer is fitted therein.

As will be apparent to those reviewing this disclosure, selectively lockable storage drawers for hand-held power tools, such as those described herein with respect to the exemplary embodiments, may have a variety of advantageous features. For example, the drawer may provide additional versatility for rotary power tools or other portable devices (e.g., the drawer may be utilized to store equipment such as tool bits, collet wrenches, and collets onboard the power hand-held tools as well as similar accessories).

Another advantageous feature is such that the storage drawer is configured with a latching mechanism (or locking mechanism) which selectively locks the storage drawer within the housing compartment. Since the drawer is lockable within the housing, the user is able to maneuver the power tool in various positions.

It is important to note that the construction and arrangement of the storage drawer as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements (e.g., the drawer may be partially removable from the tool housing in an arrangement similar to furniture drawers), the position of elements may be reversed or otherwise varied (e.g., the battery pack may be positioned on side of the cavity and storage drawer), and the nature or number of discrete elements or positions may be altered or varied (e.g., multiple storage drawers of varying sizes may be utilized with the hand-held power tool). Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the exemplary embodiments without departing from the scope of the present inventions as expressed in the appended claims.

What is claimed is:

1. A hand-held power tool comprising:

a housing having a cavity provided therein;

a drawer provided within the cavity;

a flexible member coupled to the drawer; and a latching mechanism having a first member and a second member; wherein the first member of the latching mechanism is coupled to the housing and wherein the second member of the latching mechanism is coupled to the flexible member;

wherein the drawer may be selectively latched within the cavity of the housing.

2. The hand-held power tool of claim 1, wherein the cavity is adjacent a battery pack.

3. The hand-held power tool of claim 1, wherein the flexible member includes a first and second end, the first and second ends configured in a manner to unlock the latching mechanism upon compressing the first and second end along a lateral axis of the housing.

4. The hand-held power tool of claim 3, wherein the first member of the latching mechanism is biased in a manner to lock the first and second members of the latching mechanism in the housing when the first and second ends are not compressed.

5. The hand-held power tool of claim 1, wherein the flexible member includes two grip locations, each of which are respectively located on the outer surface of the first and second ends of the flexible member.

6. The hand-held power tool of claim 5, wherein the grip locations include a concave surface defined within the flexible member.

7. The hand-held power tool of claim 5, wherein the grip locations include a series of depressions.

8. The hand-held power tool of claim 1, wherein the flexible member rests substantially flush with respect to the housing when the storage compartment of the drawer is completely fitted within the cavity.

9. The hand-held power tool of claim 1, wherein the second member of the latching mechanism is flexible with respect to the first member of the latching mechanism.

10. The hand-held power tool of claim 1, further comprising:

a rail system configured to enable the drawer to slide in and out of the cavity.

11. The hand-held power tool of claim 10, wherein the rail system includes at least one protruding surface extending from the drawer and at least one complementary channel defined by the housing.

12. The hand-held power tool of claim 10, wherein the rail system is configured in a manner to retain the drawer in all non-sliding directions.

* * * * *

UNITED STATES PATENT AND TRADEMARK OFFICE

CERTIFICATE OF CORRECTION

PATENT NO. : 7,547,167 B2
APPLICATION NO. : 11/229296
DATED : June 16, 2009
INVENTOR(S) : Baber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this

Seventh Day of September, 2010

David J. Kappos
*Director of the United States Patent and Trademark Office*